United States Patent [19]
Suzuki et al.

[11] Patent Number: 5,703,348
[45] Date of Patent: Dec. 30, 1997

[54] HAND-HELD OPTICAL CODE READER

[75] Inventors: Masashi Suzuki; Makoto Sugiyama, both of Mishima, Japan

[73] Assignee: Kabushiki Kaisha TEC, Tokyo, Japan

[21] Appl. No.: 574,717

[22] Filed: Dec. 19, 1995

[30]     Foreign Application Priority Data

Dec. 26, 1994 [JP] Japan .................................... 6-321897
Feb. 23, 1995 [JP] Japan .................................... 7-035701

[51] Int. Cl.$^6$ ........................................................ G06K 7/10
[52] U.S. Cl. .................................................. 235/472; 235/462
[58] Field of Search ................................ 235/454, 472, 235/462

[56]             References Cited

U.S. PATENT DOCUMENTS

5,500,516  3/1996  Durbin .................................... 235/472
5,521,366  5/1996  Wang et al. ............................ 235/454

*Primary Examiner*—Donald T. Hajec
*Assistant Examiner*—Jeffrey R. Filipek
*Attorney, Agent, or Firm*—Frishauf, Holtz, Goodman, Langer & Chick

[57]              ABSTRACT

An optical code reader has of a reading window, a guide light source for guiding a two-dimensional code into a reading range outside the read window, an illumination light source for illuminating the two-dimensional code guided into the reading range, an optical system for focusing light reflected from the two-dimensional code illuminated by the illumination light source to form an image, an image sensor for sensing the image formed by the optical system, a read control circuit for reading the two-dimensional code on the basis of the sensed image, and a hand-held frame, having an opening which serves as the read window. The hand-held frame holds the guide light source, illumination light source, optical system, image sensor, and read control circuit. The optical system has a focal distance by which the image of the two-dimensional code is most clearly formed in a state where the two-dimensional code is located at a target point which is a specific distance away from the read window, and the guide light source has a group of light-emitting elements for projecting spotlight beams which intersect at the target point.

13 Claims, 6 Drawing Sheets

HAND-HELD OPTICAL CODE READER

BACKGROUND OF THE INVENTION

1. Field of the Invention

This invention relates generally relates to an optical code reader that reads a two-dimensional code, and more particularly to an optical code reader that is held in a hand and brought close to a two-dimensional code at the time of reading.

2. Description of the Related Art

Many supermarkets use bar codes printed on article labels for sales registration. The bar code represents an article code by a combination of bars arranged side by side in a line and is optically read by, for example, a hand-held bar code reader that is held in a hand and brought close to the bar code at the time of reading. In recent years, bar codes are finding their application into factories, the distribution industry, the service businesses and the like. In these fields of application, various types of article management information must be represented in the form of bar codes and the data capacity of a bar code tends to run short. With this backdrop, two-dimensional codes, such as multi-bar codes or matrix array codes, have been developed to handle a large volume of article management information.

A conventional two-dimensional code reader is composed of, for example, an industrial TV camera, a TV monitor, and an image processing unit, which are connected to each other by cables. The TV camera shoots the two-dimensional code printed on an article label under indoor illumination. The TV monitor displays an image of the two-dimensional code shot by the TV camera. The image processing unit performs the image processing of reading the two-dimensional code from the two-dimensional code image. The reading result is supplied from the image processing unit to an external host computer via communication lines.

The two-dimensional code reader, however, is expensive, as well as large and heavy. In addition, with the TV camera, the focus and aperture of the optical system must be adjusted each time a two-dimensional code is set in front of the TV camera. Even when the adjustment of the focus and aperture is made automatically, this delays starting to read the two-dimensional code.

It can be considered that the problem is solved by using a hand-held two-dimensional code reader for reading a two-dimensional code on an article label set in contact with the reader. With this two-dimensional code reader, because a distance between the reader and the code is fixed, the focus and aperture of the optical system can be adjusted in advance according to the distance and consequently they need not be readjusted to read another two-dimensional code. Unlike the case of using a TV camera, this two-dimensional code reader must touch an article label to successfully read an article code thereon. If the focus and aperture of the optical system is properly corrected, the two-dimensional code reader may successfully read the article code without touching the article label. However, it is not easy to bring the two-dimensional code reader to a preset position with respect to the two-dimensional code.

SUMMARY OF THE INVENTION

The object of the present invention is to provide a hand-held optical code reader capable of reading a two-dimensional code easily and reliably in a noncontacting manner at the time of reading.

The foregoing object is accomplished by providing an optical code reader comprising: a reading window; a guide light source for guiding a two-dimensional code into a reading range outside the read window; an illumination light source for illuminating the two-dimensional code guided into the reading range; an optical system for focusing light reflected from the two-dimensional code illuminated by the illumination light source to form an image; a reading unit for sensing the image formed by the optical system and which reads the two-dimensional code on the basis of the sensed image; and a hand-held frame member, having an opening which serves as the read window, for holding the guide light source, illumination light source, optical system, and reading unit; wherein the optical system has a focal distance by which the image of the two-dimensional code is most clearly formed in a state where the two-dimensional code is located at a target point which is a specific distance away from the read window, and the guide light source has a group of light-emitting elements for projecting spotlight beams which intersect at the target point.

With the optical code reader, the spotlight beams from the light-emitting elements intersect at a target point which is the specific distance away from the read window. When the target point is not on the two-dimensional code, the spotlight beams will form spots on the two-dimensional code. These spots come closer to each other as the distance between the target point and the two-dimensional code gets shorter. When the distance is zero, the spots will overlap on the two-dimensional code. Namely, it can be confirmed from the overlapping of the spots, that the target point has coincided with the position of the two-dimensional code. This enables the optical code reader to read a two-dimensional code easily and reliably in a noncontacting manner at the time of reading, without requiring a complex configuration.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Figure 1:
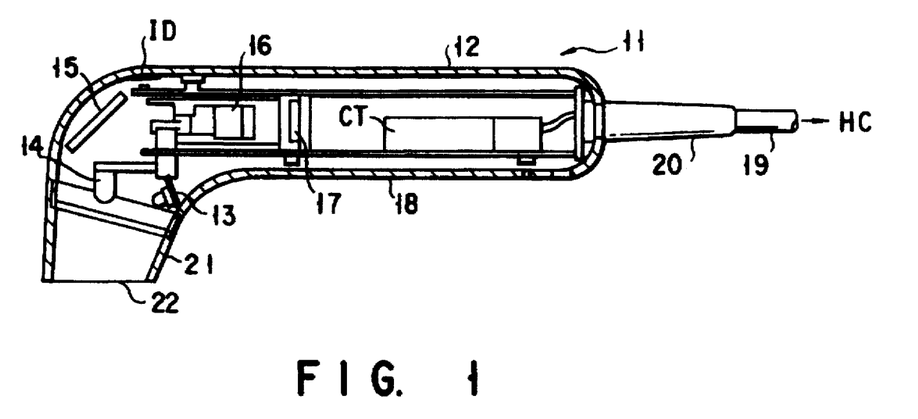
FIG. 1 is a sectional view of a two-dimensional code reader according to a first embodiment of the present invention.
Figure 2:
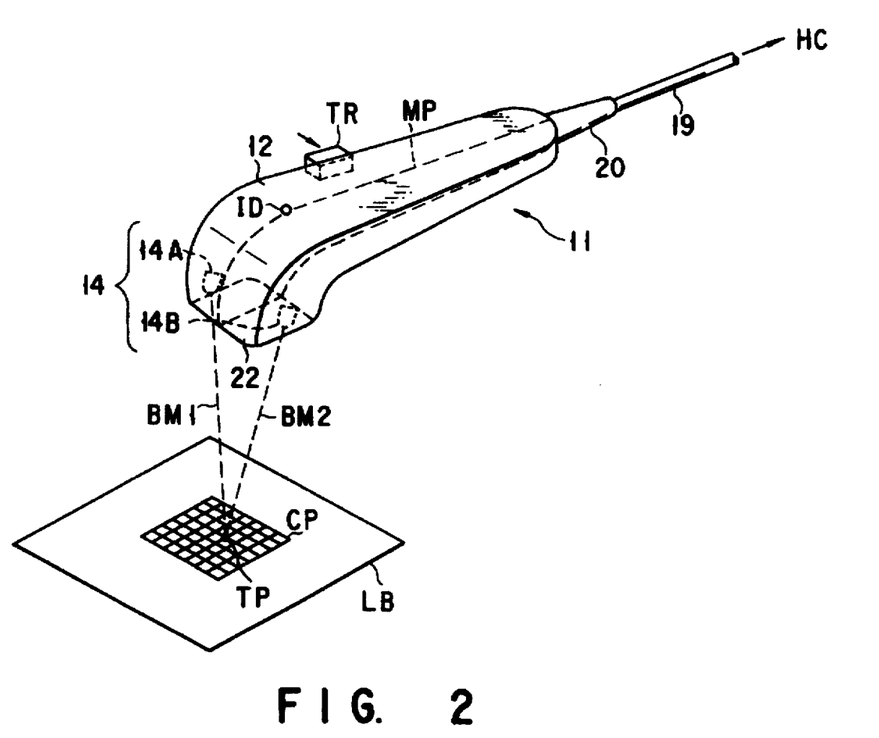
FIG. 2 is a schematic perspective view of the two-dimensional code reader shown in FIG. 1.

A two-dimensional code reader 11 according to a first embodiment of the present invention will now be described with reference to FIGS. 1 to 4. FIG. 1 shows the internal configuration of the two-dimensional code reader 11. FIG. 2 shows an outer appearance of the two-dimensional code reader 11. The two-dimensional code reader 11 is used to read a two-dimensional code CP printed on a medium, such as an article label LB, in a noncontacting manner, and supply the reading result to an external host computer HC.

The two-dimensional code reader 11 includes a hollow frame molded so as to be easy to hold in a hand and a rectangular cap 21 provided in communication with the open front end of the frame 12. The cap 21 is detachably connected to the frame 12 by fitting for maintenance or repair, for example, and in this state, has an opening away from the front end of the frame 12 as a read window 22 of the two-dimensional code reader 11. The two-dimensional code reader 11 further includes an illumination light source 13, a guide light source 14, a reflecting mirror 15, an optical mechanism section 16, an image sensor 17, a circuit board 18, a read control circuit CT, a trigger switch TR, and a read indicator ID. The illumination light source 13, guide light source 14, reflecting mirror 15, optical mechanism section 16, image sensor 17, circuit board 18, and read control circuit CT are all housed in the frame 12. The trigger switch TR is mounted on the side of the frame 12 to input an instruction to read a two-dimensional code CP. The read indicator ID is mounted on the top of the frame 12 to indicate the completion of reading the two-dimensional code CP. The read control circuit CT is mounted on the circuit board 18 and electrically connected to the trigger switch TR, illumination light source 13, guide light source 14, image sensor 17, and read indicator ID. The read control circuit CT is further electrically connected to a host computer HC via a connection cable 19 which is fixed to the distal end of the frame 12 using a protective member 20.

The guide light source 14 is driven to guide the two-dimensional code CP into a reading range provided outside the read window 22. The illumination light source 13 is driven to illuminate the two-dimensional code CP guided into the reading range. The reflecting mirror 15 reflects light reflected from the two-dimensional code CP toward the optical mechanism section 16. The optical mechanism section 16 is made up of a variable focus lens and a filter, and focuses the reflected light from the reflecting mirror 15 to form an image on a light-receiving surface of the image sensor 17. The focal distance of the optical mechanism section 16 has been adjusted previously so that the clearest image of the two-dimensional code CP can be obtained in a state where the two-dimensional code CP is distanced from the read window 22 by a specific distance D. The image sensor 17 contains an area CCD (Charge Coupled Device) which has a light-receiving surface where a plurality of photocells are arranged in a matrix, and senses the image formed on the light-receiving surface by the optical mechanism section 17 to produce an output voltage in accordance with the amount of charge sequentially obtained from the photocells in a specific clock cycle. The output voltage of the CCD is output from the image sensor 17 as an analog video signal.

The read control circuit CT has a known arrangement containing a light source controller, an image processing circuit, a main controller, and a communication circuit, etc, and performs a control required for reading a two-dimensional code CP on the basis of the image sensed by the image sensor 17. The light source controller selectively drives the illumination light source 13 and the guide light source 14. The image processing circuit performs a processing of converting the analog video signal from the image sensor 17 to dot image data, using an amplifier circuit, a waveform-shaping circuit, and a binary circuit. The main controller permits the guide light source 14 to be driven only during the period required to position the two-dimensional code CP. After the positioning, the controller permits the illumination light source 13 to be driven only during the period required to read the two-dimensional code CP. With the two-dimensional code CP illuminated by the illumination light source 13, the controller identifies the portion corresponding to the two-dimensional code CP in the dot image data and reads (or recognizes) the two-dimensional code CP by decoding the image data in the identified portion. After the reading has been completed, the controller drives the read indicator ID and supplies the reading result to the host computer HC via the communication circuit.

The illumination light source 13 and guide light source 14 will be described in more detail. The illumination light source 13 is composed of light-emitting elements each having a relatively low optical directivity. These light-emitting elements are arranged in a line at a position deeper than the read window 22 and adjacent to the underside of the frame 12, and project through the read window 22 illumination lights which overlap each other to illuminate the entire reading range. The light-emitting elements have different optical directivities previously selected for preventing nonuniform illumination within the reading range. The guide light source 14 is made up of two light-emitting elements 14A and 14B each having a sufficiently high optical directivity. These light-emitting elements 14A and 14B are placed at a position deeper than the read window 22 and adjacent to both side faces of the frame 12, and project two spotlight beams BM1 and BM2 through the read window 22 to guide a two-dimensional code CP into the reading range. Specifically, the light-emitting elements 14A and 14B are spaced the same distance apart from a vertical plane MP that splits the two-dimensional code reader 11 in equal two pieces, a right half and a left half, and perpendicular to the plane of the read window 22. The elements 14A and 14B are tilted by the same angle so that the spotlight beams BM1 and BM2 may intersect at a target point TP as shown by the broken lines in FIG. 2. Each of the light-emitting elements 14A and 14B is composed of a lens that suppresses the diffusion of the spotlight beam and a highly transparent cover that supports the lens. The periphery of each spotlight beam is set to have a higher luminance (brightness) than the inside of the spotlight beam so that the periphery may form a concentric light ring in a cross section. The target point TP is located a specific distance D away from the read window 22 along the center axis of the reading range passing vertically through the center of the read window 22 plane. When the position of the two-dimensional code CP coincides with the target point TP, the image of the two-dimensional code CP is formed most clearly on the light-receiving surface of the image sensor 17.

Figure 3:
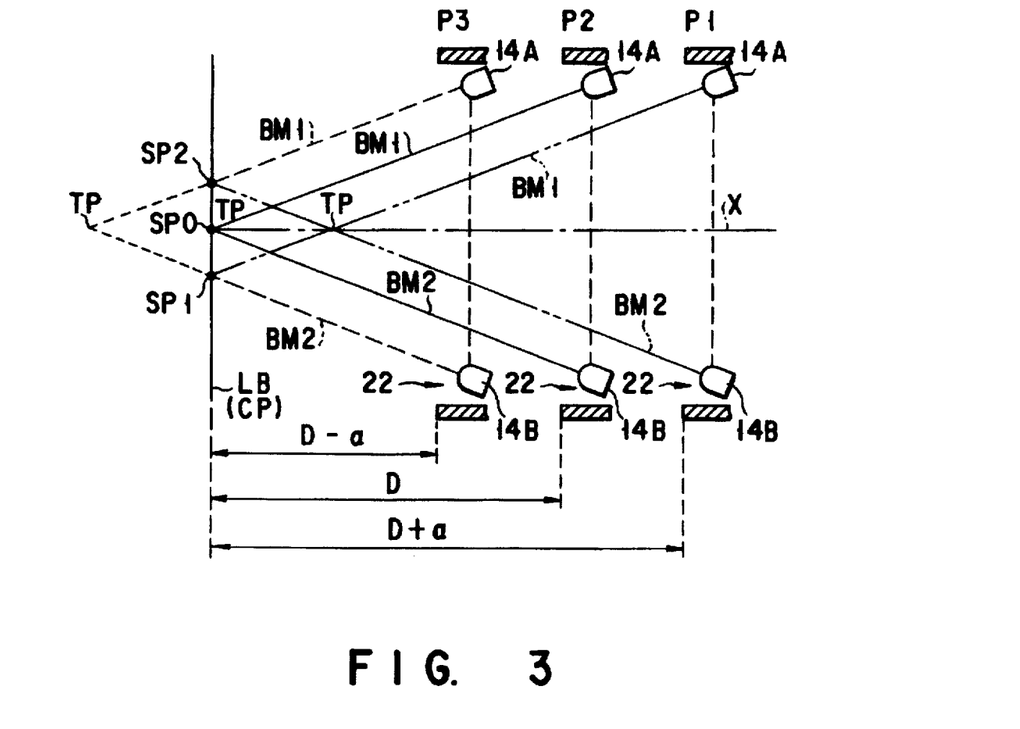
FIG. 3 is a view showing the optical paths of two spotlight beams shown in FIG. 2, with respect to the distance between the two-dimensional code reader and the two-dimensional code.
Figure 4:
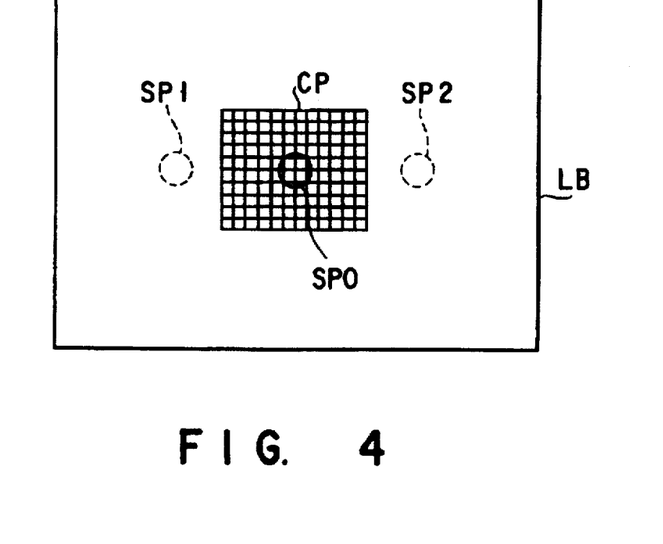
FIG. 4 is a view showing a change in the number of spots formed by the two spotlight beams projected from the positions shown in FIG. 3.

FIG. 3 shows the optical paths of two spotlight beams BM1 and BM2 shown in FIG. 2 with respect to the distance between the two-dimensional code reader 11 and the two-dimensional code CP. In FIG. 3, the components other than the read window 22 and light-emitting elements 14A and 14B are omitted. The light-emitting elements 14A and 14B are positioned symmetrically with the center axis X of the reading range. The center axis X must be set perpendicular to the article label LB in order to accurately sense the entire image of the two-dimensional code CP. Keeping this point in mind, the operator holds the two-dimensional code reader 11 in his or her hand and brings it closer to the article label LB. When the two-dimensional code reader 11 has reached position P1, the article label LB is located a more distant than the specific distance D from the read window 22. At this time, the spotlight beams BM1 and BM2 intersect at the target point TP in front of the article label LB as shown by the two-dot-dash lines and form spots SP1 and SP2 on the article label LB. When the two-dimensional code reader 11 has arrived at position P2, the article label LB is located at the specific distance D from the read window 22. At this time, the spotlight beams BM1 and BM2 intersect at the target point TP on the article label LB as shown by the solid lines and form spot SP0 on the article label LB. When the two-dimensional code reader 11 has got to position P3, the article label LB is located a nearer than the specific distance D from the read window 22. At this time, the spotlight beams BM1 and BM2 advance toward the target point TP behind the article label LB as shown by the broken lines and form spots SP1 and SP2 on the article label LB.

The distance between the spots SP1 and SP2 decreases as the two-dimensional code reader 11 moves from position P1 to position P2, and increases as the reader 11 moves from position P2 to position P3. Because these spots SP1 and SP2 combine into spot SP0 when the two-dimensional code reader 11 has reached position P2, it is possible to confirm from the overlapping of these spots that the read window 22 is located the specific distance D apart from the article label LB. It is apparent that the luminance (brightness) of spot SP0 is higher than that of spots SP1 and SP2. When the center axis X of the reading range is perpendicular to the article label LB, the spotlight beams BM1 and BM2 have the same optical path length between the light-emitting elements 14A and 14B and the article label LB. If the two-dimensional code reader 11 tilts to one side, a difference will be made in the optical path length between the spotlight beams BM1 and BM2. The difference distorts the light ring formed in the spots SP1 and SP2. The light ring takes the form of an expanded oval when being illuminated by the spotlight beam with a longer optical path length, and takes the form of a contracted oval when being illuminated by the spotlight beam with a shorter optical path length. Therefore, by adjusting the tilt of the two-dimensional code reader 11 so that the shape of the light ring may return to a concentric circle, the center axis X of the read window 22 can be made perpendicular to the article label LB.

Hereinafter, the operation of the two-dimensional code reader 11 constructed as described above will be described.

The operator holds the two-dimensional code reader 11 in his or her hand and brings it closer to the two-dimensional code CP printed on an article label LB, and presses the trigger switch TR at a position where the read window 22 is the specified distance D away from the two-dimensional code CP, thereby instructing the reading of the two-dimensional code CP. To prevent a failure in the reading, the read control circuit CT turns on the guide light source 14 (that is, the light-emitting elements 14A and 14B) before the trigger switch TR is operated. The two-dimensional code reader 11 is held so that the spotlight beams BM1 and BM2 from the light-emitting elements 14A and 14B may illuminate the article label LB (that is, two-dimensional code CP). The two-dimensional code CP is guided accurately into the reading range by placing the center of the two-dimensional code CP between the spots SP1 and SP2 formed by the spotlight beams BM1 and BM2. If the spots SP1 and SP2 have distorted light rings, the tilt of the two-dimensional code reader 11 will be adjusted so that the shape of the light ring may return to a concentric circle to make the center axis X in the reading range perpendicular to the article label LB. The distance between the spots SP1 and SP2 reduces as the two-dimensional code CP gets closer to the target point TP. When the position of the two-dimensional code CP has coincided with the target point TP, the spots SP1 and SP2 combine into spot SP0. In this state, the trigger switch TR is pressed.

The read control circuit CT detects the operation of the trigger switch TR and turns on the illumination light source 13 in place of the guide light source 14. When the two-dimensional code CP is illuminated by light from the illumination light source 13, the reflected light from the two-dimensional code CP is directed to the light-receiving face of the image sensor 17 via the optical system composed of the reflecting mirror 15 and the optical mechanism section 16, and is formed as an image of the two-dimensional code CP. The image sensor 17 senses the image and supplies an analog video signal to the read control circuit CT. The read control circuit CT converts the analog video signal from the image sensor 17 into dot image data and identifies the portion corresponding to the two-dimensional code CP in the dot image data. By decoding the image data in the identified portion, the control circuit CT reads the two-dimensional code CP. After the reading, the control circuit CT turns on the read indicator ID and supplies the reading result to the host computer HC.

With the two-dimensional code reader 11 of the first embodiment, the spotlight beams BM1 and BM2 from the light-emitting elements 14A and 14B intersect at the target point TP that is the specific distance D apart from the read window 22 and is the center of the reading range, the distance D depending on the focal distance of the optical mechanism section 16. When the target point TP is not on the two-dimensional code CP, two spots SP1 and SP2 are formed by the spotlight beams BM1 and BM2 on the two-dimensional code CP. These spots SP1 and SP2 come closer to each other as the distance between the target point TP and the two-dimensional code CP gets shorter. When the distance becomes zero, the spots SP1 and SP2 combine into spot SP0. Namely, the fact that the target point TP has coincided with the position of the two-dimensional code CP can be confirmed from the formation of the single spot SP0. Therefore, the two-dimensional code reader 11 requires no complex configuration and is capable of reading a two-dimensional code in a noncontacting manner easily and reliably at the time of reading.

While in the first embodiment, the illumination light source 13 may be provided on the outside of the frame 12 instead of being provided on the inside of the frame 12. The reflecting mirror 15 may be replaced with a prism. The guide light source 14 is not limited to use of the two light-emitting elements 14A and 14B, but may be composed of three or more light-emitting elements. Although the two-dimensional code reader 11 is of the wand type held in a hand, it may be of the gun type.

A two-dimensional code reader 41 according to a second embodiment of the present invention will now be described with reference to FIGS. 5 to 10. In the second embodiment, the trigger switch TR and reflecting mirror 15 of FIG. 1 are eliminated and the outer appearance and the arrangement of the read control circuit CT are modified. Except for these things, the two-dimensional code reader 41 is constructed in a manner similar to that used for the two-dimensional code reader 21 of the first embodiment. Thus, in FIGS. 5 to 10, the same parts in function are indicated by the same reference symbols as those in the first embodiment, and their explanation will be simplified.

Figure 5:
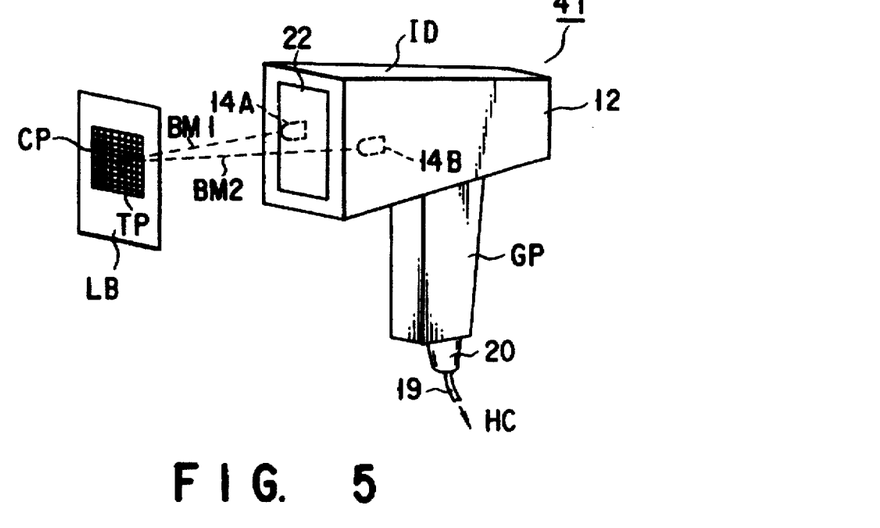
FIG. 5 is a schematic perspective view of a two-dimensional code reader according to a second embodiment of the present invention.
Figure 6:
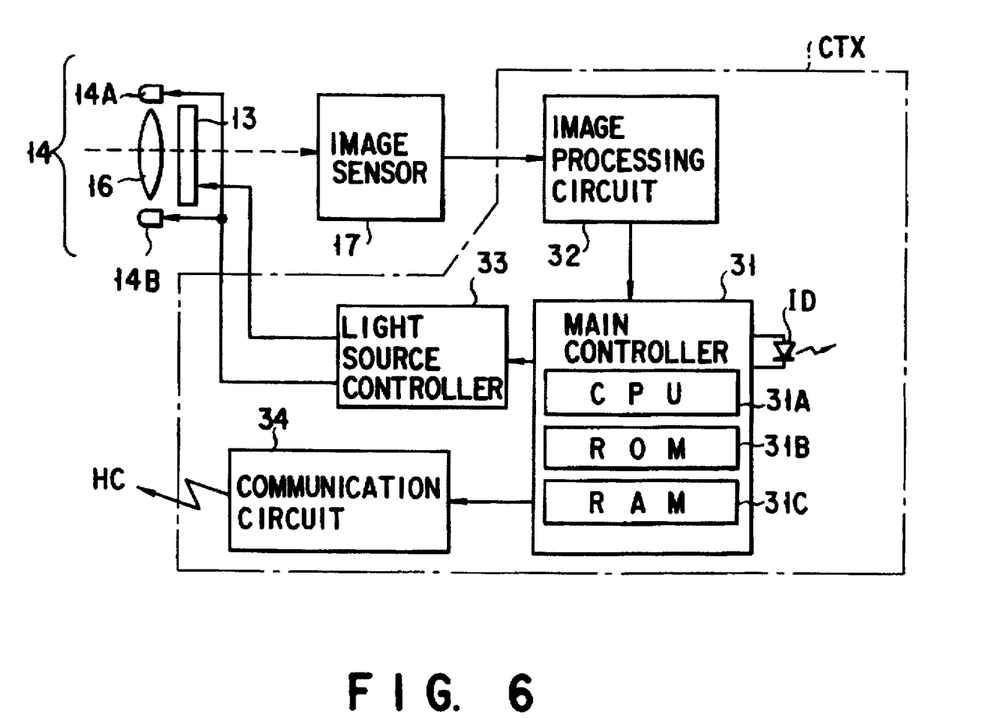
FIG. 6 is a block diagram of the circuit of the two-dimensional code reader shown in FIG. 5.
Figure 7:
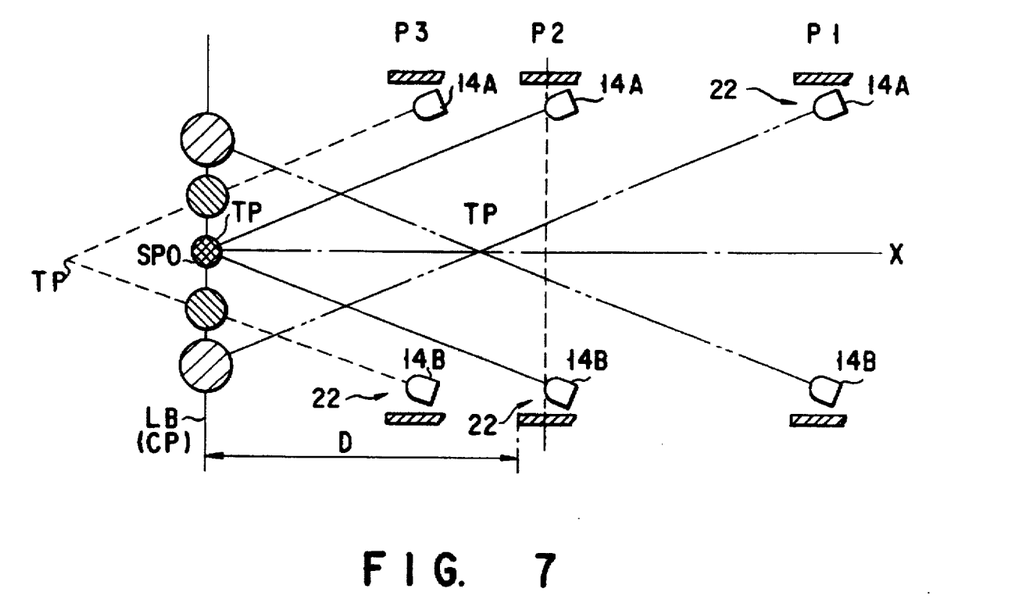
FIG. 7 is a view showing the optical paths of two spotlight beams shown in FIG. 5 and the spots formed by these

The two-dimensional code reader 41 has an outer appearance of the gun type as shown in FIG. 5. The reader includes a hollow frame 12 and a grip GP formed integrally with the underside of the frame 12. The front end of the frame 12 is open as a read window 22. As shown in FIG. 6, the two-dimensional code reader 41 further includes an illumination light source 13, a guide light source 14, an optical mechanism section 16, an image sensor 17, a read control circuit CTX, and a read indicator ID. The illumination light source 13, guide light source 14, optical mechanism section 16, image sensor 17, and read control circuit CTX are all housed in the frame 12 and grip GP. The read indicator ID is mounted on the top of the frame 12 to indicate the completion of reading the two-dimensional code CP. The read control circuit CTX is electrically connected to the illumination light source 13, guide light source 14, image sensor 17, and read indicator ID. The read control circuit CTX is further electrically connected to a host computer HC via a connection cable 19 which is fixed to the bottom end of the grip GP using a protective member 20.

The guide light source 14 is driven to guide the two-dimensional code CP into the reading range provided outside the read window 22. The illumination light source 13 is driven to illuminate the two-dimensional code CP guided into the reading range. The optical mechanism section 16 is made up of a variable focus lens and a filter and focuses the reflected light from the two-dimensional code to form an image on the light-receiving surface of the image sensor 17. The focal distance of the optical mechanism section 16 has been adjusted previously so that the clearest image of the two-dimensional code CP can be obtained in a state where the two-dimensional code CP is distanced from the read window by a specific distance D. The image sensor 17 has an area CCD with a light-receiving surface where a plurality of photocells are arranged in a matrix, and senses the image formed on the light-receiving surface by the optical mechanism section 17 to produce an output voltage in accordance with the amount of charge sequentially obtained from the photocells in a specific clock cycle. The output voltage of the CCD is output from the image sensor 17 as an analog video signal.

The details of the illumination light source 13 and guide light source 14 are identical with those in the first embodiment. Specifically, the illumination light source 13 is composed of a plurality of light-emitting elements each having a relatively low optical directivity. These light-emitting elements are arranged in a line at a position deeper than the read window 22 and adjacent to the underside of the frame 12, and project through the read window illumination lights which overlap each other to illuminate the entire reading range. The light-emitting elements have different directivities previously selected for preventing nonuniform illumination within the reading range. The guide light source 14 is made up of two light-emitting elements 14A and 14B each having a sufficiently high optical directivity. These light-emitting elements 14A and 14B are placed at a position deeper than the read window 22 and adjacent to both side faces of the frame 12, and project two spotlight beams BM1 and BM2 through the read window 22 to guide a two-dimensional code into the reading range. Specifically, the light-emitting elements 14A and 14B are spaced the same distance apart from a vertical plane that splits the two-dimensional code reader 41 in equal two pieces, a right half and a left half, and perpendicular to the plane of the read window 22. The elements are tilted by the same angle so that the spotlight beams BM1 and BM2 may intersect at a target point TP as shown by the broken lines in FIG. 5. Each of the light-emitting elements 14A and 14B is composed of a lens that suppresses the diffusion of spotlight beam and a highly transparent cover that supports the lens. The periphery of each spotlight beam is set to have a higher luminance (brightness) than the inside of the spotlight beam so that the periphery may form a concentric light ring in a cross section. The target point TP is located a specific distance D away from the read window 22 along the center axis of the reading range passing vertically through the read window 22 plane. When the position of the two-dimensional code CP coincides with the target point TP, the image of the two-dimensional code CP is formed most clearly on the light-receiving surface of the image sensor 17.

The read control circuit CTX has a new arrangement containing a main controller 31, an image processing circuit 32, a light source controller 33, and a communication circuit 34, and performs a control required for reading two-dimensional codes on the basis of the image sensed by the image sensor 17. The light source controller 33 selectively drives the illumination light source 13 and the guide light source 14. The image processing circuit 32 performs a processing of converting the analog video signal from the image sensor 17 to dot image data, using an amplifier circuit a waveform-shaping circuit, and a binary circuit. The main controller 31 permits the guide light source 14 to be driven only during the period required to position the two-dimensional code CP. After the positioning, the controller 31 permits the illumination light source 13 to be driven only during the period required to read the two-dimensional code CP. With the two-dimensional code CP illuminated by the illumination light source 13, the controller 31 identifies the portion corresponding to the two-dimensional code CP in the dot image data obtained by the image processing circuit 32 and reads (or recognizes) the two-dimensional code CP by decoding the image data in the identified portion. After the reading has been completed, the controller 31 drives the read indicator ID and supplies the reading result to the host computer HC via the communication circuit 34. With the two-dimensional code CP illuminated by the spotlight beams BM1 and BM2 from the light-emitting elements 14A and 14B in the guide light source 14, the main controller 31 identifies the portion corresponding to the spots formed by the spotlight beams BM1 and BM2 in the dot image data obtained by the image processing circuit 32. The main controller 31 detects the number of spots, the spot positions, the spot area, and changes in the spot area. On the basis of the detection results, the controller 31 confirms that the two-dimensional code CP and the read window 22 are in the optimum positional relationship where the positioning should be completed, and starts the reading of the two-dimensional code CP. Namely, the reading of the two-dimensional code CP is started when the article label LB has reached position P2 the specific distance D apart from the read window 22. At this time, the spotlight beams BM1 and BM2 intersect at the target point TP on the article label LB as shown by the solid lines and form spot SP0 on the article label LB.

The main controller 31 includes a CPU 31A that controls the light source controller 33, image processing circuit 32, communication circuit 34, and read indicator ID, a ROM 31B that stores fixed data such as the control program for the CPU 31A, decode tables, and the like, and a RAM 31C that temporarily stores the input and output data of the CPU 31A. The RAM 31C contains areas for storing dot image data, spot area data, an area decrement flag, and a trigger flag.

Figure 8:
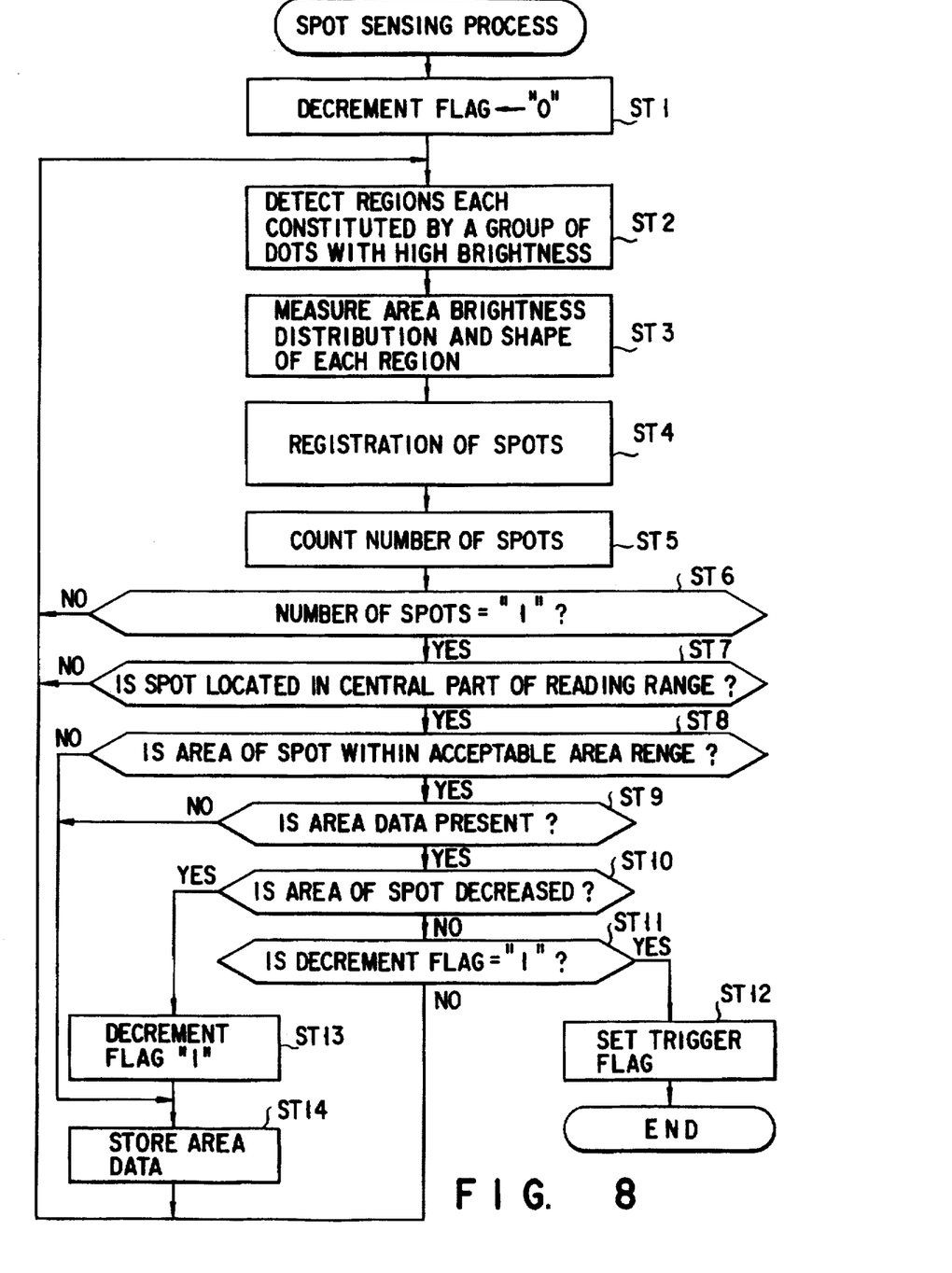
FIG. 8 is a flowchart for a spot sensing process performed by a CPU shown in FIG. 6.

FIG. 8 shows a spot sensing process performed by the CPU 31A. The spot sensing process is carried out in a state where the guide light source 14 is ON and the illumination light source 13 is OFF. In this state, the spot images formed by the spotlight beams BM1 and BM2 are sensed by the image sensor 17 and converted by the image processing circuit 32 into dot image data. When the spot sensing process is started, step ST1 is executed to initialize the decrement flag to "0" in the RAM 31C. In step ST2, the CPU 31A detects as spot candidates the regions each constituted by a group of high-luminance dots in the dot image data supplied from the image processing circuit 32. In step ST3, the CPU 31A measures the area and luminance distribution of each spot candidate as well as its outline. In step ST4, the CPU 31A detects a spot candidate whose measurement results coincide with the predetermined features inherent to an actual spot, and registers the spot candidate regarded as a spot by assigning an identification number thereto. In step ST5, the CPU 31A counts the number of spots registered. Then, in step ST6, it is confirmed that the number of spots registered is "1". In step ST7, it is confirmed that the spot is located near the center of the reading range. In step ST8, it is confirmed that the area of the spot is in the acceptable area range. In step ST9, it is confirmed that the spot area data related to the spot exists in the RAM 31C. In step ST10, it is confirmed that the area of the spot is not less than the area indicated by the spot area data. In step ST11, it is confirmed that the decrement flag is "1". After the confirmation in steps ST6 to ST11, the CPU 31A sets the trigger flag in the RAM 31C to start the reading of the two-dimensional code CP, and terminates the spot sensing process.

When the number of spots is detected to be larger than "1" in step ST6, when in step ST6, when the spot is detected to be not near the center of the reading range in step ST7, or when the decrement flag is detected to be not "1" in step ST11, step ST2 is executed again.

When the area of the spot is detected to be outside the acceptable area range in step ST8, or when no spot area data for the spot is detected in the RAM 31C in step ST9, the area of the spot will be stored as spot area data in the RAM 31C in step ST14, and then step ST2 is executed again.

Furthermore, when in step ST10 the area of the spot is detected to be less than the area indicated by the spot area data, the decrement flag is set to "1" in the RAM 31C in step ST13, the area of the spot is stored as spot area data in the RAM 31C in step ST14, and thereafter step ST2 is executed again.

Figure 9:
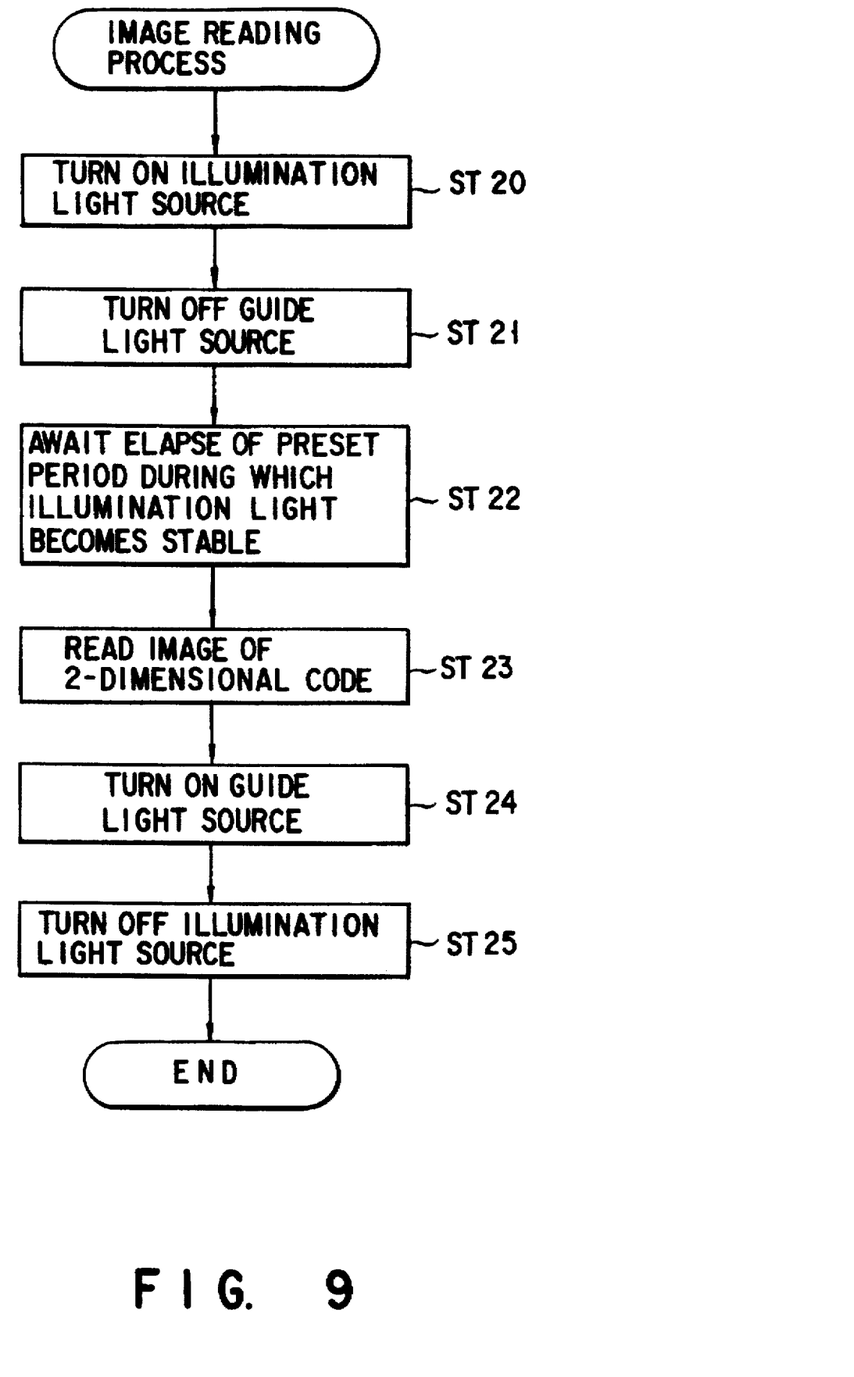
FIG. 9 is a flowchart for an image reading process performed by the CPU shown in FIG. 6.

FIG. 9 shows the image reading process performed by the CPU 31A. The image reading process is performed when the trigger flag is set to "1" in the RAM 31C. When the image reading process is started, the illumination light source 13 is turned on in step ST20, the guide light source 14 is turned off in step S21, and the CPU 31A is in the wait state until a preset time required for the illumination light to be stable has elapsed. After the illumination light has been stable, the image of the two-dimensional code CP illuminated by the light is sensed by the image sensor 17. The sensed image is converted by the image processing circuit 32 into dot image data, from which the two-dimensional code CP is read in step ST 23.

Specifically, the CPU 31A identifies the portion corresponding to the two-dimensional code CP in the dot image data obtained by the image processing circuit 32, reads (or recognizes) the two-dimensional code CP by decoding the image data in the identified portion, drives the read indicator ID after the completion of the reading, and supplies the reading result to the host computer HC via the communication circuit 34.

Thereafter, the guide light source 14 is turned on in step ST24, and the illumination light source 13 is turned off in step ST25. After the illumination light source 13 has turned off, the image reading process is terminated and the above-described spot sensing process is performed again.

Figure 10:
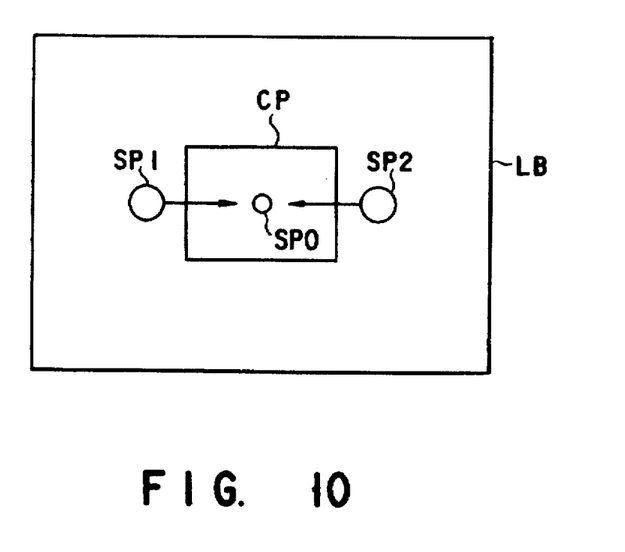
FIG. 10 is a view showing a change in the number of spots formed by the two spotlight beams projected from the positions shown in FIG. 7.

Hereinafter, the operation of the two-dimensional code reader 41 thus constructed will be described. With the two-dimensional code reader 41, the two-dimensional code CP printed on an article label LB is read automatically. The operator holds the two-dimensional code reader 41 in his or her hand and brings it closer to the two-dimensional code CP printed on the article label LB. To prevent a failure in the reading, the read control circuit CTX causes the guide light source 14 (i.e., the light-emitting elements 14A and 14B) to turn on in advance. Initially, the spotlight beams BM1 and BM2 from the light-emitting elements 14A and 14B form spots SP1 and SP2 on the article label LB as shown in FIG. 10. As the read window 22 gets closer to the two-dimensional code CP, the spots SP1 and SP2 come closer to the mid-point between them, get smaller in size, and become higher in luminance. As long as the center of the two-dimensional code CP lies between the spots SP1 and SP2, the two-dimensional code CP is almost always kept in the reading range. These spots SP1 and SP2 finally combine into spot SP0 at the center of the two-dimensional code CP. Thereafter, the area of the spot SP0 continues to decrease until the read window has accurately reached a position a specific distance D away from the two-dimensional code CP. When the read window 22 gets closer to the two-dimensional code CP than the specific distance D, the area of spot SP0 starts to increase. The read control circuit CTX detects this change as a trigger, and starts to read the two-dimensional code CP. The read operation is the same as in the first embodiment.

With the second embodiment, as with the first embodiment, the spotlight beams BM1 and BM2 intersect at the target point TP that is in the center of the reading range and is spaced the specific distance D away from the read window 22, the specific distance D depending on the focal distance of the optical mechanism section 16. When the target point TP is not on the two-dimensional code CP, two spots SP1 and SP2 are formed by the spotlight beams BM1 and BM2 on the two-dimensional code CP. These spots SP1 and SP2 come closer to each other as the distance between the target point TP and the two-dimensional code CP gets shorter. When the distance becomes zero, the two spots will combine into spot SP0. Namely, it can be confirmed from the appearance of the single spot SP0 that the target point TP has coincided with the position of the two-dimensional code CP.

Furthermore, after confirming that the target point TP has coincided with the position of the two-dimensional code CP, the read control circuit CTX automatically starts to read the two-dimensional code CP, so that the operator need not operate the trigger switch TR used in the first embodiment. Therefore, this reduces the work load on the operator, thereby increasing the reading efficiency.

In the second embodiment, the illumination light source 13 may be provided on the outside of the frame 12 instead of being provided on the inside of the frame 12. The two-dimensional code reader 41 may be constructed into the wand type that is held in a hand. The guide light source 14 is not limited to use of the two light-emitting elements 14A and 14B, but may be composed of three or more light-emitting elements. In this case, a plurality of light-emitting elements are divided into, for example, two groups. The light-emitting elements are set so that two spots may overlap each other at two points symmetrical with respect to the center of the reading range.

Furthermore, even when the two spotlight beams do not overlap each other so as to form a single spot completely, the two-dimensional code CP can be read. Thus, in the above-described spot sensing process, by setting the trigger flag when the area where the two spots overlap each other decreases below a preset value, instead of setting the trigger flag with the timing that the area of the spot changes from a decrease to an increase, sufficiently accurate code reading can be achieved.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An optical code reader comprising:
   a reading window;
   a guide light source for guiding a two-dimensional code into a reading range outside said read window;
   an illumination light source for illuminating the two-dimensional code guided into the reading range;
   an optical system for focusing light reflected from the two-dimensional code illuminated by said illumination light source to form an image;
   a reading unit for sensing the image formed by said optical system and which reads the two-dimensional code on the basis of the sensed image; and
   a hand-held frame member, having an opening which serves as said read window, for holding said guide light source, said illumination light source, said optical system, and said reading unit;
   wherein:
      said optical system has a focal distance by which the image of the two-dimensional code is most clearly formed in a state where the two-dimensional code is located at a target point which is a specific distance away from said read window;
      said guide light source has a group of light-emitting elements for projecting spotlight beams which intersect at the target point;
      said reading unit includes sensing means for sensing an image formed by said optical system; and processing means for processing the image sensed by said sensing means;
      said processing means includes instructing means for generating a read instruction when the location of said two-dimension code coincides with the target point; driving means for driving said guide light source before generation of the read instruction, and for driving said illumination light source after generation of said read instruction; and decoding means for decoding the image of the two-dimensional code illuminated by said illumination light source;
      said instructing means includes detecting means for detecting a single spot formed by said spot light beams in the image sensed by said sensing means; and
      said detecting means includes registering means for registering each portion having predetermined features in the image sensed by said sensing means as a spot.

2. An optical code reader according to claim 1, wherein said target point is set at a center of the reading range.

3. An optical code reader according to claim 1, wherein said driving means includes means for turning on one of said guide light source and said illumination light source after the other is turned off.

4. An optical code reader according to claim 1, wherein said detecting means further includes confirming means for confirming that a single spot has been registered by said registering means.

5. An optical code reader according to claim 4, wherein said confirming means includes means for confirming that the single spot is located near the center of the reading range.

6. An optical code reader according to claim 5, wherein said confirming means further includes means for confirming that the single spot has an area which falls within an acceptable range.

7. An optical code reader according to claim 6, wherein said confirming means further includes means for confirming that the area of the single spot has been changed from a decreasing direction to an increasing direction.

8. An optical code reader comprising:
   a reading window;
   a guide light source for guiding a two-dimensional code into a reading range outside said read window;
   an optical system for focusing light reflected from the two-dimensional code guided into the reading range to form an image;
   a reading unit for sensing the image formed by said optical system and which reads the two-dimensional code on the basis of the sensed image; and
   a hand-held frame member, having an opening which serves as said read window, for holding said guide light source, said optical system, and said reading unit;
   wherein;
      said optical system has a focal distance by which the image of the two-dimensional code is most clearly formed in a state where the two-dimensional code is located at a target point which is a specific distance away from said read window;
      said guide light source has a group of light-emitting elements for projecting spotlight beams which intersect at the target point;
      said reading unit includes sensing means for sensing an image formed by said optical system; and processing means processing the image sensed by said sensing means;
      said processing means includes instructing means for generating a read instruction when the location of said two-dimesional code coincides with the target point; driving means for driving said guide light source before generation of the read instruction; and decoding means for decoding the image of the two-dimensional code under environmental illumination;
      said instructing means includes detecting means for detecting a single spot formed by said spot light beams in the image sensed by said sensing means; and said detecting means includes registering means for registering each portion having predetermined features in the image sensed by said sensing means as a spot.

9. An optical code reader according to claim 8, wherein said detecting means further includes confirming means for confirming that a single spot has been registered by said registering means.

10. An optical code reader according to claim 9, wherein said confirming means includes means for confirming that the single spot is located near the center of the reading range.

11. An optical code reader according to claim 10, wherein said confirming means further includes means for confirming that the single spot has an area which falls within an acceptable range.

12. An optical code reader according to claim 11, wherein said confirming means further includes means for confirming that the area of the single spot has been changed from a decreasing direction to an increasing direction.

13. An optical code reader according to claim 8, wherein said target point is set at a center of the reading range.

* * * * *